United States Patent Office 3,249,582
Patented May 3, 1966

3,249,582
AROMATIC AMINE STABILIZED POLYACETALS
Heinz Schmidt, Günther Roos, and Otto Mauz, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 6, 1962, Ser. No. 177,724
Claims priority, application Germany, Mar. 11, 1961, F 33,399
10 Claims. (Cl. 260—45.9)

The present invention relates to stabilized polyacetals and a process for preparing same.

Polyacetals are polymers that are based on structural units of the following formula:

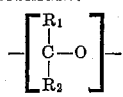

in which $R_1$ represents a hydrogen atom and $R_2$ stands for a hydrogen atom or an alkyl radical which may be substituted.

Several processes are known which enable macromolecular polyoxyalkylene polymers having a certain thermal stability to be prepared by anionic or cationic polymerization. It is also known to copolymerize aldehydes and cyclic acetals with formals or cyclic ethers or other monomers which are polymerizable according to an ionic polymerization mechanism. Copolymers which have thus been prepared possess ether bonds in addition to acetal bonds in the polymer chain, and therefore have a better thermal stability. The macromolecular polyacetals forming during the polymerization and containing terminal hydroxyl groups depolymerize, when heated, in a sort of "zipper" reaction with re-formation of the aldehyde. This decomposition reaction can be prevented by blocking the terminal groups, for example, by esterification or etherification, and this leads to the formation of products having a considerably improved thermal stability.

However, polyacetals the terminal groups of which have been stabilized are also more or less unstable when exposed to the action of heat as is the case, for example, when the products are processed on the ordinary machines for molding or processing thermoplasts. In such a case the chain may split and the products may depolymerize and, as a consequence, monomeric aldehydes and their secondary products form. It has already been proposed to render polyacetals stable to the action of heat by means of hydrazine derivatives, urea derivatives, thiourea derivatives, polyamides or dicarboxylic acid diamides. All these substances have the function of intercepting the aldehydes and their secondary products which form during thermal splitting, to block the active centers forming in the polymer and to prevent any depolymerization. Polyacetals are even less stable when exposed simultaneously to the action of heat and oxygen. A number of substances are already known which are suitable for rendering polyacetals stable to oxidative decomposition. As examples of such substances there may be mentioned amines, phenols, organic compounds containing sulfur and nitrogen atoms in the molecule, for example, thiodiazoles, and organic mono- and polysulfide compounds.

It has already been proposed to use compounds of the benzo or acetophenone type as substances bringing about a good stabilizing effect against decomposition caused by the action of light.

Now we have found that macromolecular polyacetals can be protected against the action of heat and oxygen by adding to them 0.1 to 10% by weight, preferably 0.5 to 5% by weight, calculated on the polyacetal, of one or more aromatic compounds containing at least one, preferably 1 or 2, azomethine groups. It is particularly advantageous to use compounds of the following formulae:

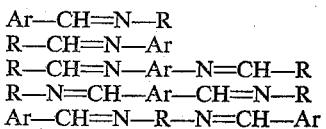

In these formulae Ar represents an aromatic radical, for example, a phenyl or a naphthyl radical, which may be substituted by OH-groups and/or alkoxy groups containing 1 to 4 carbon atoms and/or alkyl groups containing 1 to 4 carbon atoms; R may be equal to Ar, or it may represent a residue of a saturated or ethylenically unsaturated aliphatic hydrocarbon containing 2 to 18 carbon atoms, or it may be a residue of a cycloaliphatic hydrocarbon containing 5 to 10 carbon atoms, in particular a cyclohexyl radical, or it may represent a heterocyclic radical, for example, a phenyl oxazole radical.

The above mentioned substances are added to the polyacetals in order to stabilize them during the processing operations.

The aromatic azomethine compounds to be used according to the invention are prepared, for example, by reacting an aldehyde with an appropriate amine. The following compounds which are mentioned by way of example and to which the process of the present invention is not to be limited are particularly efficacious stabilizers: N-o-hydroxybenzylidene-2.6-diethylaniline, N-o-hydroxybenzylidene-oleyl-amine, N,N'-dibenzylidene-p-phenylenediamine, N-2-hydroxy-naphthylidene-4-hydroxyaniline, N-2-hydroxy-naphthylidene-biphenylamine, N-2-hydroxy-naphthylidene-3-hydroxy-aniline.

The efficiency of the above-mentioned processing stabilizers can be considerably improved by adding, in addition to these stabilizers, 0.1 to 10% by weight, preferably 0.2 to 5% by weight, of antioxidizing agents, for example special phenols, to the polyacetals to be stabilized, the said percentages being calculated on the polyacetal.

When azomethine compounds and antioxidizing agents are used together a strong synergistic action takes place. Particularly efficacious systems are obtained when the above-mentioned processing stabilizers are used in combination with terpene-substituted phenols, for example, 6.6' - bis - (2-4 - diisobornyl-oxyphenyl)-methane, 6-isobornyl-2.4-xylenol the double bonds of which may be hydrogenated to 80%, condensation products of o-cresol and camphene containing the two substances in different molar ratios and condensation products of cresol, camphene and formaldehyde containing the substances in different molar ratios. Up to 80% of the double bonds of the condensation products may be hydrogenated.

The properties of the polyacetals which have been stabilized according to the invention can be further improved by the addition of known light stabilizers, for example, benzophenone derivatives and acetophenone derivatives.

Macromolecular polyacetals can be used as plastic materials only on the condition that their stability during the thermoplastic processing is sufficient and that the shaped articles made from them are stable to the actions of heat, oxygen and light without undergoing decomposition or getting brittle. Polyacetals tend to decompose especially when they are processed on the ordinary machines for processing thermoplasts and during this operation aldehydes and their secondary products form. The pressure of the gaseous decomposition products may become so high as to cause the mass of plastic material to be driven out, for example, of the cylinder of an injection molding machine so that articles containing bubbles are obtained which are worthless.

The stabilizers according to the invention have the function of suppressing or preventing the depolymerization of the polyacetals and to intercept the aldehyde and its secondary products forming during the decomposition.

In order to examine the processing stability, which is equal to thermal stability, the stabilizers according to the invention were added in different concentrations to polytrioxane having acetylated terminal groups and the behaviour at 210° C. was examined in an apparatus as is used for determining the melt index of thermoplastic materials according to the method of ASM 1238–52T.

The mass is filled into the cylinder, the piston is fitted onto its without the application of additional weight and the period is determined after which a beginning decomposition of the mass can be observed, which is perceptible by the rising of the piston. The degree of the thermal decomposition is determined by measuring the change in the flow properties of the molten mass. For this purpose the melt indices $i_2$ are ascertained after residence times of 5', 15' and 30' at 210° C. The mass of plastic material which was pressed out when the melt indices were determined is examined with regard to the formation of bubbles. The stabilizers according to the invention may be admixed with the macromolecular polyacetals according to a known method. For example, the above-mentioned stabilizers may be intimately mixed in the dry state with the polyacetals by means of an efficacious mixer or they may be incorporated with the plastic mass at an elevated temperature by means of a kneader. The above-mentioned stabilizers may also be dissolved in a solvent and then be added to the polyacetal. A particularly homogeneous distribution of the stabilizer is brought about when the solution of the stabilizer in a solvent is added to the polyacetal while stirring and the solvent is subsequently evaporated in a current of hot nitrogen, while stirring. It is also possible to suspend stabilizer and polyacetal in a solvent which is subsequently evaporated in a current of hot nitrogen while stirring.

The stabilizers according to the invention may be used for stabilizing polyacetals, preferably polyoxymethylenes, as well as copolymers of trioxane and cyclic ethers or cyclic acetals, for example, ethylene oxide, diethylene glycol formal, dioxolane, butane diol formal or tetrahydrofurane, which possess terminal hydroxyl groups, preferably those whose terminal hydroxyl groups have been blocked, for example, by esterification or etherification.

The following examples serve to illustrate the invention but they are not intended to limit it thereto. The parts and percentages indicated in the table and mentioned in the examples are by weight, the percentages being calculated on the polyacetal.

In the following examples the tendency towards depolymerization, the melt index and the appearance of the molten mass with regard to the formation of bubbles were measured at 210° C. in an apparatus for measuring the melt index with polyacetals to which different stabilizers had been added. Besides, the different pulverulent mixtures were compressed at 190° C. and under a pressure of 50 kilograms per square centimeter, which pressure was increased to 100 kilograms per square centimeter when the mass grew cold, to form plates 0.5 mm. thick and the resistance to aging at an elevated temperature was determined by tempering in a warming cabinet at 120° C. Table 1 comprises the results obtained and, for comparison purposes, the corresponding values determined with unstabilized polyoxymethylene and with polyoxymethylene which had been stabilized with malonic acid diamide.

The melt indices $i_2$ were determined in known manner at 210° C.

The experiments described in the examples were carried out with acetylated polyoxymethylenes which had a solution viscosity at 140° C. within the range of 0.3 to 3 deciliters per gram, preferably 0.5 to 2 deciliters per gram, the said viscosity being determined with a solution of the polymer of 0.5% strength, in butyrolactone to which 2% of diphenyl amine serving as stabilizer had been added.

EXAMPLE 1

1 part of 2-oxy-benzylidene-2.6-diethylaniline in 100 parts of methanol was added, while stirring, to 100 parts of a polyacetal which had been prepared by polymerizing trioxane according to the process described in Belgian Patent 585,980 and which had then been acetylated. The methanol was removed, while stirring, in a current of nitrogen having a temperature of 80° C. In order to dry the test portion to a large extent it was kept for two hours at 70° C. in a vacuum drying cabinet. In the testing apparatus described above the stabilized powder was examined at 210° C. with regard to its tendency towards depolymerization. The resistance to aging was measured with pressed plates 0.5 mm. thick at 120° C. in a warming cabinet. For comparison purposes polyoxymethylene which had not been stabilized and polyoxymethylene which had been stabilized with malonic acid diamide in a manner analogous to that described above were examined. The results are indicated in Table 1.

EXAMPLE 2

In the manner described in Example 1, 100 parts of a polyacetal which had been prepared by polymerizing trioxane and which had then been acetylated, were treated with 1 part of 2-oxy-benzylidene-oleylamine in 100 parts of methanol and examined. The results are indicated in Table 1.

EXAMPLE 3

In the manner described in Example 1, 100 parts of a polyacetal which had been prepared by polymerizing trioxane and which had then been acetylated, were treated with 1 part of β-oxynaphthylidene-p-oxyaniline in 100 parts of acetone and examined. The results are indicated in Table 1.

EXAMPLE 4

In the manner described in Example 1, 100 parts of a a polyacetal which had been prepared by polymerizing trioxane and which had then been acetylated, were treated with 1 part of 2-oxybenzylidene-biphenylamine in 100 parts of acetone and examined. The results are indicated in Table 1.

EXAMPLE 5

In the manner described in Example 1, 100 parts of a polyacetal which had been prepared by polymerizing trioxane and which had then been acetylated were treated with 1 part of β-oxynaphthylidene-m-oxyaniline in 100 parts of acetone and examined. The results are indicated in Table 1.

EXAMPLE 6

In the manner described in Example 1, 10 parts of a polyacetal which had been prepared by polymerizing trioxane and which had then been acetylated were treated with 1 part of N,N'-dibenzylidene-p-phenylene-diamine in 100 parts of acetone and examined. The results are indicated in Table 1.

EXAMPLE 7

In the manner described in Example 1, 100 parts of a polyacetal which had been prepared by polymerizing trioxane and which had then been acetylated were treated with 0.5 part of bis-(di-isobornyloxyphenyl)-methane and 0.5 part of N,N'-dibenzylidene-p-phenylene-diamine in 100 parts of acetone and examined. For comparison purposes the polyacetal was stabilized in an analogous manner with 1 part of bis-(diisobornyl-oxyphenyl)-methane alone. The results are indicated in Table 1.

EXAMPLE 8

In the manner described in Example 1, 100 parts of a polyacetal which had been prepared by polymerizing trioxane and which had then been acetylated were treated with 0.5 part of 6-isobornyl-2.4-xylenol and 0.5 part of N,N'-dibenzylidene-p-phenylene-diamine in 100 parts of acetone and examined. For comparison purposes the polyacetal was stabilized in an analogous manner with 1 part of 6-isobornyl-2.4-xylenol alone and in another case with N,N'-dibenzylidene-p-phenylene-diamine alone. The results are indicated in Table 1.

In order to bring out the stabilizing effect clearly a very unstable polyacetal was used in the experiments described in this example and in the next example.

*Table 1.—Depolymerization, melt index and embrittlement of pressed plates prepared from acetylated polyacetals stabilized by means of different stabilizers*

| Example No. | Stabilizer | Content of stabilizer in percent by weight | Decomposition at 210° C. | Melt index $i_2$ at 210° C. after— | | | Appearance of the molten mass | Embrittlement or period—in days—after which the plates become brittle at 120° C. in a warming cabinet |
|---|---|---|---|---|---|---|---|---|
| | | | | 5' | 15' | 30' | | |
| 1 | None | | Immediately | 69.4 | 82.8 | (¹) | Containing bubbles, foamy. | Breaks |
| | Malonic acid diamide | 1 | Immediately weak, after 5' strong. | 26.8 | 25.6 | 27.4 | Containing bubbles. | 2 |
| | [phenol-CH=N-phenyl with C₂H₅ groups] | 1 | Immediately weak. | 12.7 | 13.1 | 12.5 | Several bubbles. | 2 |
| 2 | [OH-phenyl-CH=N-C₉H₁₇=C₉H₁₈] | 1 | After 3' weak | 11.6 | 9.8 | 9.0 | Several bubbles. | 2 |
| 3 | HO-phenyl-N=CH-phenyl(OH) | 1 | After 10' very weak. | 9.3 | 8.2 | 11.2 | Several bubbles. | 2 |
| 4 | biphenyl-N=CH-phenyl(OH) | 1 | After 10' weak | 11.5 | 10.8 | 11.1 | Sporadic bubbles. | 2 |
| 5 | (OH)phenyl-N=CH-phenyl(OH) | 1 | After 10' very weak. | 10.6 | 10.3 | 11.2 | Sporadic bubbles. | 2 |
| 6 | phenyl-CH=N-phenyl-N=CH-phenyl | 1 | After 8' very weak. | 10.1 | 9.9 | 11.0 | Sporadic bubbles. | 2 |
| 7 | Bis(di-isobornyloxyphenyl)-methane | 1 | After 2' weak | 17.9 | 29.4 | 32.4 | Several bubbles. | Breaks |
| | Bis(di-isobornyloxyphenyl)-methane plus | 0.5 | After 15' very slight. | 11.8 | 12.2 | 11.4 | No bubbles | 6 |
| | phenyl-CH=N-phenyl-N=CH-phenyl | 0.5 | | | | | | |
| 8 | phenyl-CH=N-phenyl-N=CH-phenyl | 1 | After 3' weak | 12.8 | 16.4 | 19.2 | Several bubbles. | 2 |
| | 6-isobornyl-2.4-xylenol | 1 | After 5' stronger. | 14.0 | 18.4 | 24.0 | Several bubbles. | 1 |
| | phenyl-CH=N-phenyl-N=CH-phenyl | 0.5 | Extraordinarily weak. | 12.4 | 13.0 | 13.4 | Sporadic bubbles. | 3 |
| | 6-isobornyl-2.4-xylenol | 0.5 | | | | | | |
| 9 | phenyl-CH=N-phenyl-N=CH-phenyl | 1 | After 3' weak | 12.8 | 16.4 | 19.2 | Several bubbles. | 2 |
| | 6-isobornyl-2.4-xylenol (hydrogenated to 75 to 80%) | 1 | Immediately stronger. | 10.2 | 12.4 | 13.2 | Numerous bubbles. | 1 |
| | phenyl-CH=N-phenyl-N=CH-phenyl | 0.5 | Extraordinarily weak. | 10.6 | 11.6 | 10.8 | Sporadic bubbles. | 3.5 |
| | 6-isobornyl-2.4-xylenol (hydrogenated to 75 to 80%) | 0.5 | | | | | | |

¹ Not measurable.

EXAMPLE 9

In the manner described in Example 1, 100 parts of a polyacetal which has been prepared by polymerizing trioxane and which had then been acetylated were treated with 0.5 part of 6-isobornyl-2.4-xylenol the double bonds of which had been hydrogenated to 75 to 80% and with 0.5 part of N,N'-dibenzylidene-p-phenylene-diamine in 100 parts of acetone and examined. For comparision purposes the polyacetal was stabilized in an analogous manner with 1 part of 6-isobornyl-2.4-xylenol the double bonds of which had been hydrogenated to 75 to 80% and in another case with N,N'-dibenzylidene-p-phenyldiamine alone. The results are indicated in Table 1.

We claim:

1. A composition of matter comprising a macromolecular polyoxyalkylene polymer having recurring

groups wherein $R_i$ stands for hydrogen or alkyl of up to four carbon atoms, said polymer being stabilized against decomposition upon exposure to heat and oxidation by 0.1 to 10% by weight of a stabilizer having the formula Ar—CH=N—R or Ar—CH=N-phenylene-N=CH—Ar wherein Ar is phenyl, hydroxy phenyl or hydroxy naphthyl and R is phenyl, hydroxy phenyl, lower alkyl phenyl, diphenyl, an aliphatic hydrocarbon group of 2 to 18 carbon atoms or a cycloaliphatic hydrocarbon group of 5 to 10 carbon atoms.

2. The composition of matter defined in claim 1 wherein the stabilizer is present in an amount of from 0.5 to 5% by weight.

3. The composition of matter defined in claim 1 wherein the polymer is a macromolecular polyoxymethylene polymer.

4. The composition of matter defined in claim 1 wherein the polymer is a high molecular weight polyoxymethylene polymer having esterified treminal groups.

5. The composition of matter defined in claim 1 wherein the polymer is a high molecular weight polyoxymethylene polymer having etherified terminal groups.

6. The composition of matter defined in claim 1 containing, in addition, 0.1 to 10% by weight of an antioxidizing agent selected from the group consisting of (a) 6,6'-bis-(2-4-diisobornyl-oxyphenyl)-methane, (b) 6-isobornyl-2,4-xylenol, (c) hydrogenation products thereof, (d) condensation products of o-cresol and camphene, (e) condensation products of cresol, camphene and formaldehyde and (f) hydrogenation products of said condensation products.

7. The composition of matter defined in claim 1 wherein the stabilizer is N-O-hydroxybenzylidene-oleylamine.

8. The composition of matter defined in claim 1 wherein the stabilizer is N,N'-dibenzylidene-p-phenylene diamine.

9. The composition of matter defined in claim 1 wherein the stabilizer is N-2-hydroxy-naphthylidene-4-hydroxy aniline.

10. The composition of matter defined in claim 1 wherein the stabilizer is N-2-hydroxy-naphthylidene-diphenylamine.

References Cited by the Examiner

UNITED STATES PATENTS

| | | | |
|---|---|---|---|
| 2,376,354 | 5/1945 | Gresham | 260—45.9 |
| 2,886,601 | 5/1959 | Clough | 260—560 |
| 2,951,832 | 9/1960 | Moran | 260—566 |
| 2,966,476 | 12/1960 | Kralovec | 260—45.9 |
| 3,041,165 | 6/1962 | Sus et al. | 260—560 |
| 3,055,815 | 9/1962 | Lyons | 260—566 |

LEON J. BERCOVITZ, *Primary Examiner.*

JOSEPH R. LIBERMAN, *Examiner.*

H. E. TAYLOR, *Assistant Examiner.*